United States Patent
Sebazco

(10) Patent No.: US 6,167,775 B1
(45) Date of Patent: *Jan. 2, 2001

(54) STEERING AND BRAKING CONTROL SYSTEM FOR A VEHICLE

(76) Inventor: Roy Sebazco, 4 Roman Ct. P.O. Box 436, East Hampton, NY (US) 11937

( * ) Notice: Under 35 U.S.C. 154(b), the term of this patent shall be extended for 0 days.

This patent is subject to a terminal disclaimer.

(21) Appl. No.: 08/862,128

(22) Filed: May 22, 1997

Related U.S. Application Data

(63) Continuation-in-part of application No. 08/544,676, filed on Oct. 18, 1995, now Pat. No. 5,666,857.

(51) Int. Cl.[7] .............................. B62D 1/00; B60K 41/20; G05G 11/00
(52) U.S. Cl. ................................ 74/486; 74/481; 74/496; 280/88; 188/350
(58) Field of Search .............................. 74/481, 106, 482, 74/492, 486; 280/88; 180/333; 188/350

(56) References Cited

U.S. PATENT DOCUMENTS

| | | | |
|---|---|---|---|
| 1,501,353 | * 7/1924 | McDowell | 74/483 R |
| 1,519,172 | * 12/1924 | Stewart | 74/486 |
| 1,841,294 | * 1/1932 | Nicholson | 280/88 |
| 2,128,969 | * 9/1938 | Shafer | 280/88 |
| 2,563,339 | * 8/1951 | Kellogg | 74/481 |
| 2,648,993 | * 8/1953 | Kemp | 74/486 |

FOREIGN PATENT DOCUMENTS

513292 * 9/1916 (FR) ....................................... 74/481

* cited by examiner

Primary Examiner—David A. Bucci
Assistant Examiner—William C Joyce
(74) Attorney, Agent, or Firm—Howard C. Miskin; Gloria Tsui-Yip

(57) ABSTRACT

A system which includes a steering that not only allows the operator to accomplish the steering of a vehicle, but also allows the operator to merely exert a force on the steering to control the braking mechanism of a vehicle. The steering, acting as a unitary device for controlling two of the principal operations of a vehicle, provides the operator with improved handling capabilities and does so without the operator needing to use his/her feet which makes the control system of the vehicle particularly suited for handicapped individuals.

6 Claims, 7 Drawing Sheets

STEERING AND BRAKING CONTROL SYSTEM FOR A VEHICLE

This is a continuation in part of application Ser. No. 08/544,676, filed Oct. 18, 1995, now U.S. Pat. No. 5,666,857.

The present invention relates to a steering and braking control system for a vehicle. More particularly, the present invention relates to a system utilizing the steering wheel to accomplish both the steering and braking operations of the vehicle. Specifically, the present invention relates to a system wherein the steering is accomplished in a normal manner by the operator, but the driver need only push forward on the steering wheel to accomplish the braking operations.

BACKGROUND OF THE INVENTION

Recently, Federal and State governments have made major strides to allow disabled individuals, such as paraplegics, to pursue occupations of their choice. A paraplegic may suffer paralysis of the lower half of his/her body involved with the movement of both legs which prevents his/her driving of a typical automobile and, thus, hindering his/her entrance into the work force. Although the paraplegic may be lacking in strength of his/her lower half of the body, more than likely, the paraplegic develops superior upper body strength, to more than compensate for their disability. It is desired that automobiles be provided having operator control systems that make use of the paraplegic's upper body strength and do not require the use of his/her legs.

Automobiles that employ control systems that do not require the use of the operator's leg to control the automobile, such as to perform braking operations, are known and some of which are described in U.S. Pat. Nos. 656,962 ('962); 2,471,244 ('244) and 3,117,649 ('649), all of which are herein incorporated by reference. The '962 patent discloses a system having a single device that is used to control the steering, acceleration, and braking of the vehicle, but this device is a bar handle which has limitations, especially, in the steering aspects of the automobile by present-day drivers who are use to the handling provided by a steering wheel. The '244 patent uses a primary steering wheel to accomplish the steering of an automobile and which coacts with an auxiliary steering wheel to assist in the braking operations of the automobile, but the operator's usage of two devices to control one automobile may disadvantageously cause the operator to lose the "feel" of the operating characteristics of the automobile. The '649 patent discloses an automobile that has a single handle to control the principal operations of an automobile which are the steering, acceleration and braking. However, the usage of a single handle to control an automobile has limitations, especially as mentioned for the '962 patent, to one who is accustomed to steering an automobile by the use of a steering wheel. It is desired that a control system by provided for an automobile that does not require the use of the legs of the operator to accommodate the braking operation but does not suffer from prior art limitations.

In addition to the desires of the handicapped individuals, a non-handicapped person may also desire a control system that does not require the use of his/her legs, especially, if it allows for a system that more readily controls the automobile. This enhanced control system provides continuous control by the driver with his/her hand always on the steering wheel. Such control allows this system to be used for racing cars as well as in less vigorous recreation endeavors, such as in the use of golf carts and conventional automobiles. It is desired that a control system for all types of motorized vehicles be provided that enhances the handling of the vehicles which does not require the use of the legs of the operator.

The control system disclosed allows a paraplegic having paralysis of the lower half of the body to operate a motorized vehicle safely and securely, even in racing cars in competitive races.

The control system disclosed does not require the use of legs of the operator but does include a steering wheel operating the control system, which may be adapted to various vehicles, including motorized devices such as racing cars, automobiles, wheelchairs, or golf carts.

These and other objects of the present invention as well as advantages thereof over existing prior art forms will be apparent in view of the following detailed description of the invention and the accompanying claims.

SUMMARY OF THE INVENTION

The present invention is directed to a system for operating an automobile that does not require the use of the legs of the operator, yet provides a system that is readily accepted by all users and leads to enhanced operator handling capability. The present invention is a continuation in part of the parent application Ser. No. 08/544,676, now U.S. Pat. No. 5,666,857, incorporated by reference herein.

The arrangement of the control system allows the operator to steer the vehicle with the steering wheel and the operator needs only exert a force on the steering wheel to cause the brake pedal to be forced downward and arrest the motion of the vehicle in a controlled manner without the necessity of the driver's hands leaving the steering wheel.

BRIEF DESCRIPTION OF THE DRAWINGS

FIG. 8 is similar to FIG. 1 and illustrates the overall operation of the present invention.

DETAILED DESCRIPTION OF THE PREFERRED EMBODIMENTS

Figure 1:
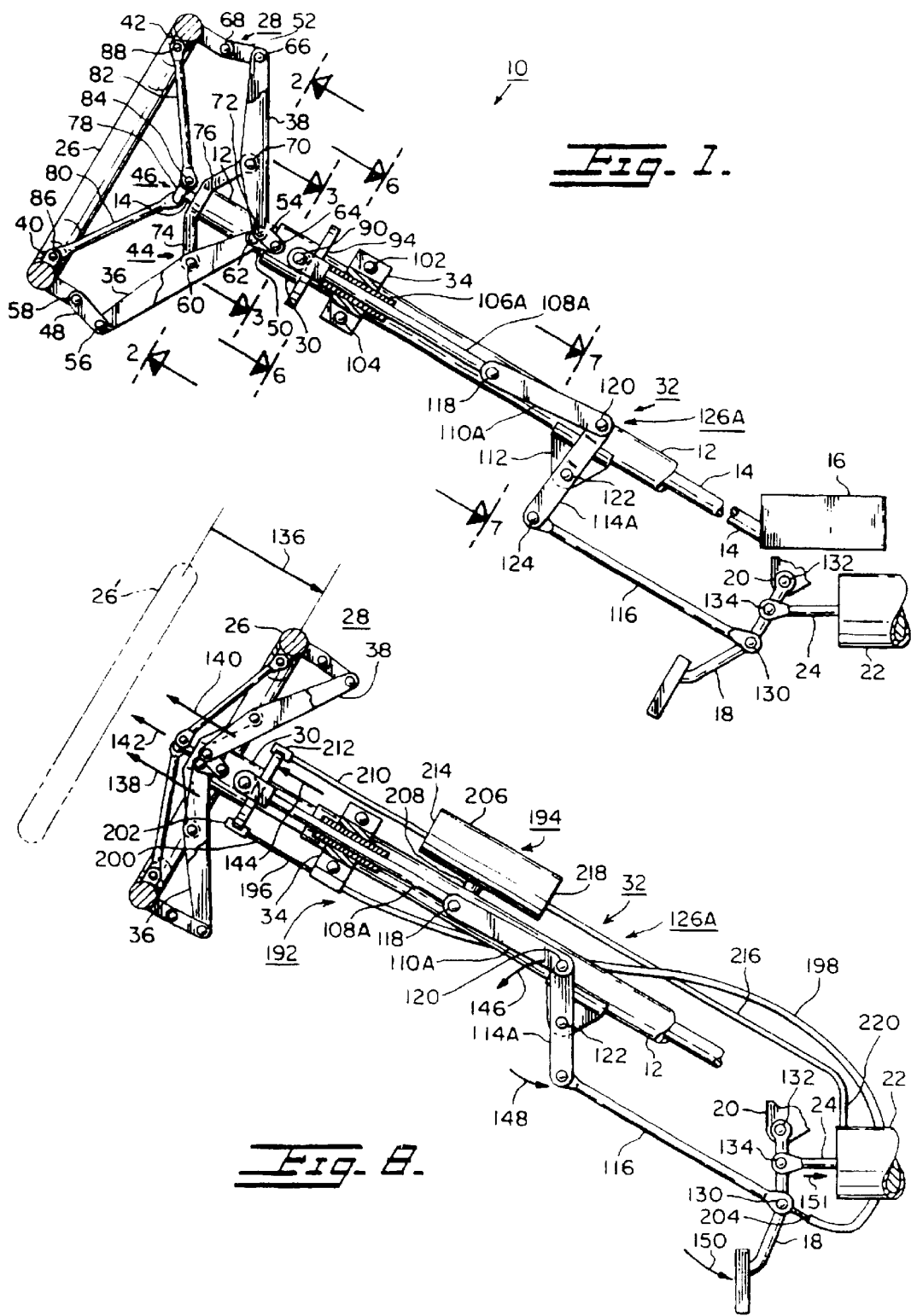
FIG. 1 is a schematic illustration in which the steering wheel of the steering and control system of the present invention is turned 90 degrees, relative to its at-rest position, primarily to illustrate, in the same view, all of the movements of the linkages.

Referring to the drawings, wherein the same reference numbers illustrate the same elements throughout, there is shown in FIG. 1 a schematic illustration of the steering and braking control system 10 of the present invention. The steering and control system 10 is coupled to the steering column 12 of a vehicle having an uppermost portion and confining a steering shaft 14 that is connected to the steering mechanism 16 of the vehicle. As seen in FIG. 1, the steering column 12 has a longitudinally extending axis. The vehicle also has a brake pedal 18, typically coupled to the interior 20 of the vehicle and connected to the brake mechanism 22, commonly by way of a push rod 24 to the braking mechanism, normally being a master brake cylinder.

The operational functions of the steering and braking control system 10 is solely performed by an operator's use of a steering wheel 26, more particularly, without the use of the operator's feet to provide for the braking operation. The steering wheel 26 is shown in FIG. 1 as being turned 90 degrees, from its at-rest position, primarily to illustrate (in the same view) all the movements of the linkage of the steering and braking control system 10. FIG. 1 also illustrates that the rotation of the steering wheel 26, as will be further described, does not affect the brake system of the vehicle in which the steering and braking control system 10 is used. The steering and braking control system 10 comprises the steering wheel 26, a pivotal mechanism 28, a sleeve 30, a force translating mechanism 32, which actuates the braking mechanism 22, and preferably, a guiding device 34.

The operator uses the steering wheel 26 to perform the steering functions in a normal manner, and when it is desired to brake the vehicle, the operator need only exert a force on the same steering wheel 26, which is pivotally connected to coact with the sleeve 30, the pivotal mechanism 28 and the force translating mechanism 32, to act in a manner similar as a cork screw device or a pumping piston, so as to draw upward or pushes downward the sleeve 30 which, in turn respectively, draws upwardly or pushes downwardly the force translating mechanism 32 which, in turn, and conversely, causes the brake pedal 18 to be pressed downward, thereby, arresting the motion of the vehicle by means of the vehicle's braking mechanism 22. The greater the pressure on the steering wheel, the greater the force applied to the brake.

The pivotal means 28 of FIG. 1 comprises first and second arms 36 and 38, first and second securing means 40 and 42 locked to or embedded in the steering wheel 26, a yoke 44, and a fastening means 46. The arm 36 has pivotal links 48 and 50 attached to opposite ends and, similarly, the arm 38 has pivotal links 52 and 54 attached to opposite ends. The pivotal link 48 is attached to the arm 36 by a retaining pin 56 and to an extension of the first securing means 40 by a retaining pin 58. The central region of the arm 36 is attached to the yoke 44 by a retaining pin 60 and one end of the arm 36 is attached to the pivotal link 50 by a retaining pin 62. As seen in FIG. 1, the location of retaining pin 60 correspondingly defines the central region of arm 36 which is interposed between the first and second ends of the arm 36. Similarly, as further seen in FIG. 1, the location of retaining pin 70 defines the central region of arm 38 which is interposed between the first and second ends of the arm 38. Furthermore, the terminology "central region," "central portion," or "intermediate portion," is used herein in an interchangeable manner and all such usages are meant to correspond to the intermediate location between the first and second ends of a structural element of the present invention, such as arm 36 or 38. A retaining pin 64 also attaches the arm 36 to the sleeve 30, as well as attaching one end of the arm 38 to the sleeve 30. The other end of the arm 38 is attached to the pivotal link 52 by a retaining pin 66 and the other end of the pivotal link 52 is attached to an extension of the second securing means 42 by means of a retaining pin 68. The central region of the arm 38 is attached to the yoke 44 by a retaining pin 70 and one end of the arm 38 is attached to the pivotal link 54 by retaining pin 72.

The yoke 44 has first and second shoulders 74 and 76 respectively connected to the first and second arms 36 and 38 via the retaining pins 60 and 70. The yoke 44 has a collar placed on top of the uppermost portion of the steering column 12.

The fastening means 46 has jaws 78 (not fully shown) connected to the steering shaft 14 that extends out of the yoke 44. The jaws 78 have provisions for receiving a retaining pin and may take the form, similar to that used in an automobile, of a nut that is threadably engaged to the steering shaft 14. The fastening means 46 further comprises first and second control bars 80 and 82 both of which have rod ends that pivot and one such end has provisions to accept a retaining pin 84 so as to pivotally fasten to the jaws 78. The other end of the control bars 80 and 82 also have rod ends that pivot and which are pivotally connected to extensions of the first and second securing means 40 and 42 by means of retaining pins 86 and 88 respectively. As will be described, although the jaws 78 engage and rotate the steering shaft 14, bearing means located proximate the sleeve 30 allow the sleeve 30 to rotate with the steering wheel 28, while the force translating means 32 maintains its axial orientation ready to be forced downward onto the arm of the brake pedal 18. The interconnections of the pivotal mechanism 28 may be further described with reference to FIG. 2 which is a cross-sectional view, taken along line 2—2, of FIG. 1.

Figure 2:
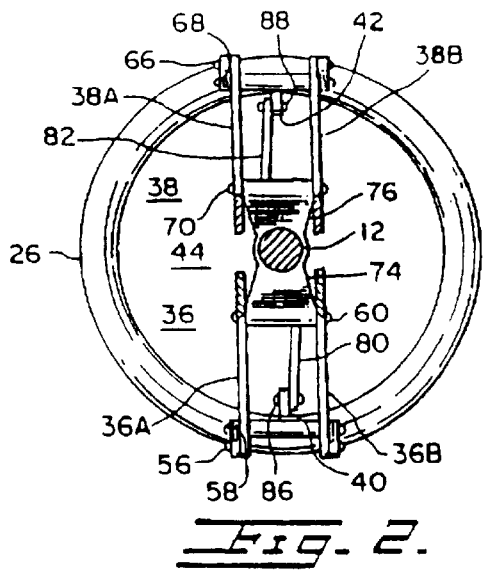
FIG. 2 is a view, taken along the line 2—2 of FIG. 1, illustrating details of the pivotal mechanism of the present invention.

As seen in FIG. 2, the arms 36 and 38, in actuality, each comprises two separate parallel plates 36A and 36B and 38A and 38B respectively. Further, as seen in FIG. 2, the shoulders 74 and 76 of yoke 44 are actually merged together and are separated from each other to provide the previously mentioned collar of yoke 44 and also a central bore therebetween that allows for the passage of the steering shaft 14 and exit thereof so as to be connected to the jaws 78 previously described with reference to FIG. 1.

As seen in FIG. 1, the sleeve 30 is connected to the lower end of the arms 36 and 38 by means of pin 64. The sleeve 30 also surrounds the steering column 12 which may be further described with reference to FIG. 3 which is a view, taken along line 3—3, of FIG. 1.

Figure 3:
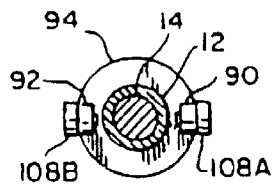
FIG. 3 is a view, taken along the line 3—3 of FIG. 1, illustrating the relationship between the sleeve of the present invention and the steering column and steering shaft both of a vehicle.

FIG. 3 illustrates two relatively small bearings 90 and 92 each having protrusions (not shown) by which the linking rods 108A and 108B (not shown) are hooked onto the sleeve 30 having a rim 94 (also see FIG. 1). The bearings 90 and 92 allowing the rim 94 and, thus, sleeve 30 to roll under them, in cooperation with the linking rods 108A and 108B, serving as cables, provide a motion transfer means in which the bearings 90 and 92 of FIG. 3 allow the axial linking rods 108A and 108B to maintain their axial orientation when the steering wheel 26 and, thus, the sleeve 30 are turned.

Figure 4:
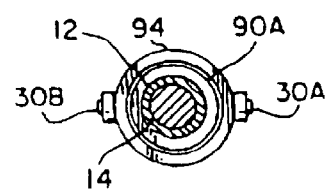
FIG. 4 is an alternate embodiment of FIG. 3 in which the two relatively small bearings of FIG. 3 are replaced by a relatively large one.

An alternate embodiment of the motion transfer means that allows for linking rods 108A and 108B to maintain their axial orientation in spite of any movement of the steering wheel 28 is shown in FIG. 4, in which the two relatively small bearings 90 and 92 are replaced by a relatively large bearing 90A. The linking rods 108A and 108B hook onto protrusions 30A and 30E, respectively, and the bearing 90A operates in a similar manner as described for bearing 90 and 92.

The motion transfer means provided by either of the embodiments of FIGS. 3 and 4 allows the steering wheel 26, attached to arms 36 and 38 and to control arms 80 and 82, to be turned while the linking rods 108A and 108B maintain their axial orientation and are ready to receive a downward force so as to cause the brake pedal 18 to be pressed downward in a manner as to be described hereinafter with reference to FIG. 8. Either of these motion transfer means may be arranged so that the linking rods 108A and 108B may be automatically disengaged from the sleeve in response to an electrical signal and such disengagement may be described with reference to FIG. 5.

Figures 5, 9, 10:
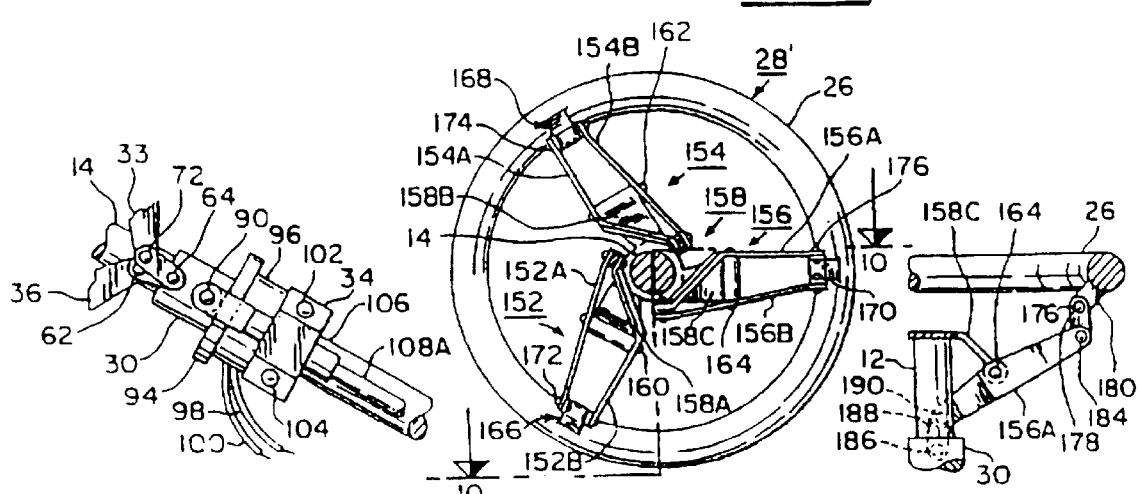
FIG. 5 is an optional solution, using an electromagnet, to allow one to automatically engage or disengage the use of the steering wheel to control the braking of the vehicle.
FIG. 9 is similar to FIG. 2 and illustrates an alternate embodiment of a pivotal mechanism of the present invention.
FIG. 10 is a view, taken along line 10—10 of FIG. 9, illustrating the interconnection between the steering column and steering wheel of the alternate embodiment of FIG. 9.

FIG. 5 is an optional solution to disengage or to secure the linking rods 108A and 108B to the sleeve 30 and, thus, to the steering wheel 26. The disengagement/engagement is provided by means of an electromagnet solenoid 96. More particularly, when an able-body human being no longer desires the benefits of the present invention he/she need only activate a switch (not shown) to supply an electrical signal, via signal paths 98 and 100, to the electromagnet solenoid 96 disengaging the solenoid 96 from the sleeve 30 and, thus, from the steering wheel 26.

As seen in FIG. 5, the guide means 34, having fasteners 102 and 104, is located below the sleeve 30 having a hat-like structure with a crown and brim 94. As seen more clearly in FIG. 1, the brim 94 is an annular flange having an opening dimensioned so as to form the bore of the sleeve 30. The guide means 34, as best seen in FIG. 1, fits over tubes 106A (also shown in FIG. 1 in cross-section) and 106B (not shown). The guide means 34 in actuality is located on opposite sides of the steering column 12 and may be further described with reference to FIG. 6 which is a view, taken along line 6—6, of FIG. 1.

Figure 6:
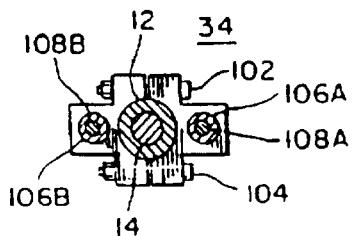
FIG. 6 is a view, taken along line 6—6 of FIG. 1, illustrating the interconnections between the guiding mechanism and the force translating mechanism both of the present invention.

As seen in FIG. 6, the guide means 34 has openings arranged from each other on opposite sides of the steering column 12 that respectively retain tubes 106A and 106B which, in turn, respectively allow for the passage therein of first and second linking rods 108A and 108B which are both part of the force translating mechanism 32 that may be further described with reference back to FIG. 1. FIG. 1 illustrates one side of the force translating mechanism 32 having elements identified with the reference letter A, but the force translating mechanism 32 also has respectively similar elements on the non-illustrated side identified herein with the reference letter B.

The force translating mechanism 32 further comprises first and second axial linking members 110A and 110B, a bracket 112, first and second offset linking members 114A and 114B and a connecting rod 116. The elements 108B and 110B, are not illustrated in FIG. 1 but are connected in the same manner as their counterparts 108A and 110A. The first linking rod 108A is connected to the first axial linking member 110A by means of a retaining pin 118. The first axial linking member 110A is connected to the first offset linking member 114A by means of retaining pin 120. The first offset linking member 114A is connected to the bracket 112 by a retaining pin 122 and to the connecting rod 116 by a retaining pin 124, each pin 122 and 124 to be further described with reference to FIG. 7. The retaining pins 122 and 124, as well as other retaining pins of the force translating mechanism 32, serve as means for allowing pivoting between interconnected members of the force translating mechanism 32. The first offset linking member 114A is joined to the first linking member 110A in a non-axial manner, that is, in a substantially perpendicular manner as viewed in FIG. 1. More particularly, the connection between the first axial linking member 110A and the offset linking member 114A are brought together in such a manner as to establish a knee region 126A, sometimes referred to as a bell crank, to be further described with reference to FIG. 8. Further connections of the offset linking member 114A, as well as the second offset linking member 114B may be further described with reference to FIG. 7 which is a view, taken along line 7—7, of FIG. 1.

Figure 7:
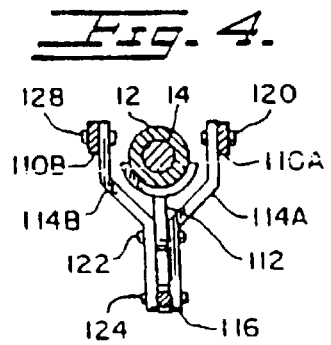
FIG. 7 is a view, taken along line 7—7 of FIG. 1, illustrating some of the interconnections of the force translating mechanism of the present invention.

As seen in FIG. 7, the first offset linking member 114A, as well as the second offset linking member 114B, have arms that extend outward so that the distance therebetween is greater than the diameter of the steering column 12. The first and second offset linking members 114A and 114B are connected to an extension of bracket 112 by the retaining pin 122 and to the connecting rod 116 by retaining pin 124. The offset linking member 114B is connected to the second axial linking member 110B by a retaining pin 128. Further connections of the connecting rod 116 may be further described with reference back to FIG. 1.

The connecting rod 116 is connected to the brake pedal 18 by means of retaining pin 130. The brake pedal 18, in turn, is connected to the interior 20 of the vehicle by a retaining pin 132 and to the push rod 24 by means of a retaining pin 134. The push rod 24 controls the booster brake cylinder 22 which, in turn, controls the braking operation of the vehicle employing the steering and braking system 10 of the present invention. The operation of the present invention may be further described with reference to FIG. 8 which illustrates the movement of the pertinent linkages of the steering and braking control system 10 that push down onto the arm of the brake pedal 18.

In operation, the steering of the vehicle is accomplished in the normal manner by the operator using the steering wheel 26. However, in accordance with the practice of the present invention, if the operator desires to stop the vehicle, he/she need only apply a downward force, in a forward direction relative to the operator, on the steering wheel 26.

The use of the steering wheel 26 combined with the pivotal elements of the steering and braking system 10 provide maximum force to the brake pedal 18 with minimum of effort on the part of the operator. The downward force applied by the operator causes the steering wheel 26 to move from its original position, indicated by the phantom representation identified by reference number 26', to its downward position indicated by the solid representation identified by reference number 26. The downward movement of the steering wheel 26 is shown by the directional arrow 136. The downward force exerted on the steering wheel 26 causes the pivotal links 48 and 52 of arms 36 and 38, respectively, to buckle outward and acquire a relatively straight orientation. Further downward force exerted on the steering wheel 26 is now transferred to the arms 36 and 38 and creates upwardly directed forces indicated by directional arrows 138 and 140, respectively, which are combined, because of the structure of the pivot mechanism 28, into an upward force indicated by arrow 142. The upward force indicated by arrow 142 in turn causes the central portion of the pivot mechanism 28 to raise the sleeve 30 in the upward direction indicated by arrow 144. The upward movement of sleeve 30 causes the force translating mechanism 32 to tend to straighten its first and second linking members 110A and 110B which, in turn, causes the joint 120 between axial linking members 110A and 110B and offset linking members 114A and 114B to move inward as indicated by directional arrow 146 carrying with it the axial offset linking members 114A and 114B. As the joint 120 is forced to move inward, it causes the axial offset linking members 114A and 114B, which are pivoted about the pin 122, to be moved downward in a pivotal manner away from the axial linking members 110A and 110B and in a counterclockwise direction indicated by arrow 148. As further seen in FIG. 8, the axial linking members 110A and 110B transversely move along side of the steering column 12 in response to the axial force exerted on the steering wheel 26. The counterclockwise movement of the offset linking members 114A and 114B in turn, cause a downward movement of the connecting bar 116 which, in turn, exerts a force on the arm of the brake pedal 18 so that the face of the brake pedal 18 is moved downward as indicated by directional arrow 150 which, in turn, causes the push rod 24 to be moved inward as indicated by directional arrow 152 which, in turn, causes the braking mechanism 22 to arrest the motion of the vehicle housing the braking and control system 10.

It should now be appreciated that the practice of the present invention provides for a steering and braking control system 10 that not only serves as a steering control device but also, by simply exerting a force on the steering wheel, allows the operator of the vehicle to control the braking action of the vehicle.

A further embodiment of the present invention that coacts with the steering wheel 26 may be further described with reference to FIG. 9. FIG. 9 illustrates a pivotal mechanism 28' that operates in a similar manner as that of the previously described pivotal mechanism 28 but has a three arm arrangement instead of the two arm arrangement of the pivotal mechanism 28 illustrated in FIG. 2. The pivotal mechanism 28' comprises first, second and third arms 152, 154 and 156 each respectively comprised of pairs of plates 152A and 152B, 154A and 154B, 156A and 156B each pair having one of its plates (152B, 154B and 156B) contoured so that the plates of the pairs are merged together at one end as shown in FIG. 9. The central portion of the first, second and third arms 152, 154 and 156 are respectively connected to a yoke 158, more particularly, to first, second and third shoulders 158A, 158B and 158C by retaining pins 160, 162 and 164 respectively. In a manner similar to that as previously described for arms 36 and 38, the central portion of the first, second, and third arms is located between respective first and second ends. Further, the first, second and third arms 152, 154 and 156 are connected to the steering wheel 26 by means of securing means 166, 168 and 170 by means of retaining pins 172, 174 and 176. Securing means 166, 168 and 170 are essentially the same as securing means 40 and 42 that are locked on or embedded in the steering wheel 26. The connection of the steering wheel 26 to the arms 152, 154 and 156, in particular, to the plate 156A of arm 156 may be further described with reference to FIG. 10 which is a view taken along line 10—10 of FIG. 9.

As seen in FIG. 10, the plate 156A is connected to the steering wheel 26 by means of pivotal link 178 which is connected to a projection 180 of the securing means 170 by means of the retaining pin 176. The pivotal link 178 is connected to the plate 156A by retaining pin 184. Further, as seen in FIG. 10, the plate 156A is connected to sleeve 30 by means of retaining pin 186 and to a second link 188 of plate 156A by a retaining pin 190.

The steering wheel 26 connected to the three arms 152, 154 and 156 operates in a similar manner as previously described with reference to FIG. 8, except that a downward force on the steering wheel 26 is translated by three arms 152, 154 and 156 so as to draw the sleeve 30 upward which, in turn, straightens out the force translating mechanism 32 which, in turn, causes the connecting rod 116 to exert a downward force onto the brake pedal 18 which, in turn, arrests the motion of the vehicle employing the embodiment of FIGS. 9 and 10.

The present invention has alternate force translating embodiments that employ cables and/or hydraulic pistons, each of which cooperates with the pivotal mechanisms of FIGS. 1–10 and each of which may be further described with reference back to FIG. 8.

FIG. 8 illustrates two separate force translating embodiments 192 and 194, each of which is operatively coupled to the steering wheel 26 by means of the pivotal mechanism 28 (FIGS. 1–8) or 28' (FIGS. 9 and 10), more particularly, by means of sleeve 30 of the pivotal mechanism.

The force translating mechanism 192 comprises a cable 196 and an outer covering or sleeve 198 which is attached to the guide means 34. The cable 196 has a first end 200 connected to sleeve 30, by means of a connector 202, and a second end 204 connected (not shown) to the retaining pin 130, which, in turn, is connected to the brake pedal 18. The force translating mechanism 192 may be used in place of or cooperating with the force translating mechanism 32 as a safety feature. In operation, pushing down of the steering wheel 26, previously described, causes the cable 196 to be pulled up by way of the first end 200 and connector 202 which, in turn, causes the second end 204 to be pulled inward causing the brake pedal to be moved downward in direction 150, thereby, operating the braking mechanism 22.

The force translating mechanism 194 comprises a hydraulic piston 206 mounted to the steering column 12 by a leg 208. The hydraulic piston 206 has a control rod or arm 210 having a first end 212 attached to sleeve 30, and a second end 214 that movably enters and exits the hydraulic piston 206. The hydraulic piston 206 also has a control line 216 serving as a hydraulic line. The control line 216 has a first end 218 operatively coupled to the hydraulic piston 206 and a second end 220 operatively coupled to the braking mechanism 22. The hydraulic piston 206 is of a conventional type and may comprise a sliding piece, such as control rod 210, whose movement creates a fluid pressure that is applied to the braking mechanism 22, via the hydraulic line 216.

The force translating mechanism 194, shown in FIG. 8 as being located below the steering wheel 26, may be operated such that the pushing downward of steering wheel 26 causes the hydraulic piston 206 to exert a hydraulic pressure, via hydraulic line 216, that is applied to braking mechanism 22 which correspondingly causes a braking action to be applied to the vehicle. For such downward movement of steering wheel 26, the hydraulic piston 206 would need to be arranged so that upward movement of its control rod 216, following its attached-to-sleeve 30, exerts a hydraulic pressure operatively coupled to the braking mechanism 22. If desired, the force translating mechanism 194 may be arranged to be interconnected to the steering wheel 26 so that downward movement of the steering wheel 26 causes a corresponding downward movement of the control rod 216 which, in turn, is responded to by the hydraulic piston 206 exerting a hydraulic pressure, via hydraulic line 216, that is applied to the braking mechanism 22 which, in turn, correspondingly causes a braking action to be applied to the vehicle.

Figure 11:
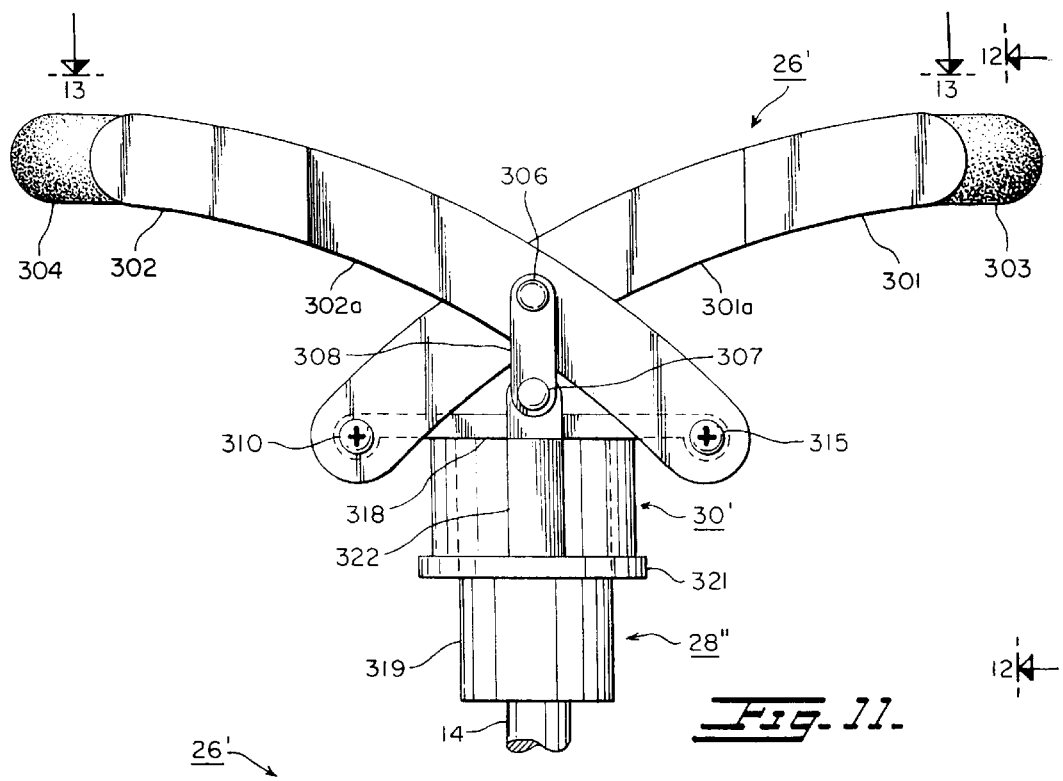
FIG. 11 is a schematic illustration of a further embodiment of the present invention in which the steering wheel of the steering and braking control system of the present invention turned 90 degrees relative to its at-rest position.

FIG. 11 illustrates a steering 26', steering member 28" and sleeve 30' which may replace the conventional steering assembly 26, steering member 28 and sleeve 30 of FIG. 1, which coacts with the force translating mechanism 32 of FIG. 1.

The steering assembly 26' of FIG. 11 comprises first and second members or arms 301 and 302. Arm 301 has a first end in the form of a yoke with spaced apart arms, between which is a steering handle 303 (shown best in FIG. 13). Similarly, the opposite arm 302 has a first end in the form of a similar yoke, between which is a steering handle 304 (shown best in FIG. 13). Extending away from the bottom or base of the yoke of the first end of arm 301 are a pair of spaced apart arms 301a and 301b (shown in FIG. 13). Similarly, extending away from the bottom or base of the yoke of the first end of arm 302 are a pair of spaced apart arms 302a and 302b (shown in FIG. 13). Arms 301a and 302a are preferably curved and parallel and pivotally interconnected between their corresponding ends by a retaining pin 306, interposed between first ends of pivotal links 308 and 309. Similarly, the arms 301b and 302b (shown in FIG. 13) are preferably curved and parallel and pivotally interconnected between their corresponding ends by a retaining pin 311 (shown in FIG. 13), interposed between first ends of pivotal links 313 and 314 (shown in FIG. 13). Interposed between arms 301a and 301b is the first side 316 (shown in FIG. 13) of first end 318 of steering member 28" through retaining pin 310. Similarly, interposed between arms 302a and 302b is the second side 317 (shown FIG. 13) of the first end 318 of steering member 28" through retaining pin 315. While arms 301a, 302a, 301b and 302b are shown curved, they may be straight or of other convenient shape.

The sleeve 30' of FIG. 11 has a hat-like structure with a brim 321 and first and second protruding wings 322 and 323. The sleeve 30' also has a bore dimensioned to allow the passage of the steering member 28". The steering assembly 26' is connected to sleeve 30' through the second ends of pivotal links 308, 309, 313 and 314. The first protruding wing 322 is interposed between pivotal links 308 and 309 and secured with a retaining pin 307. Similarly, the second protruding wing 323 is interposed between pivotal links 313 and 314 and secured with a retaining pin 312 (shown in FIG. 12).

Figure 12:
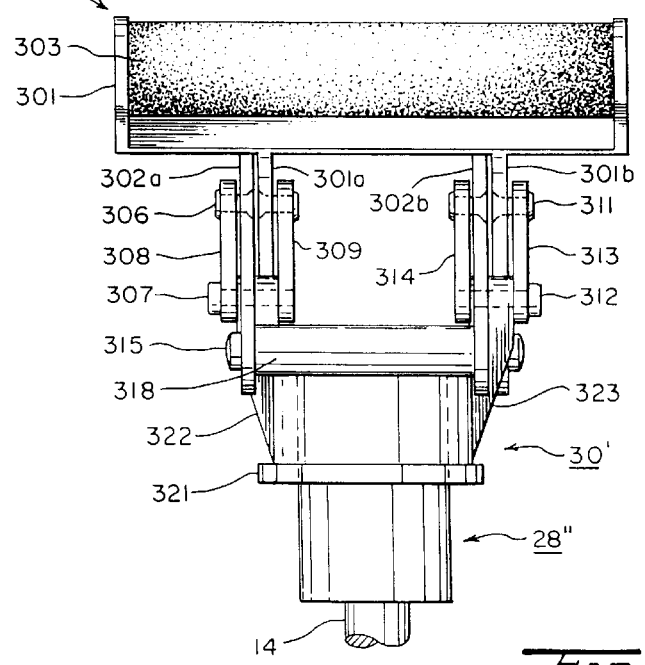
FIG. 12 is a side view, taken along the line 12—12 of FIG. 11.
Figure 12A:
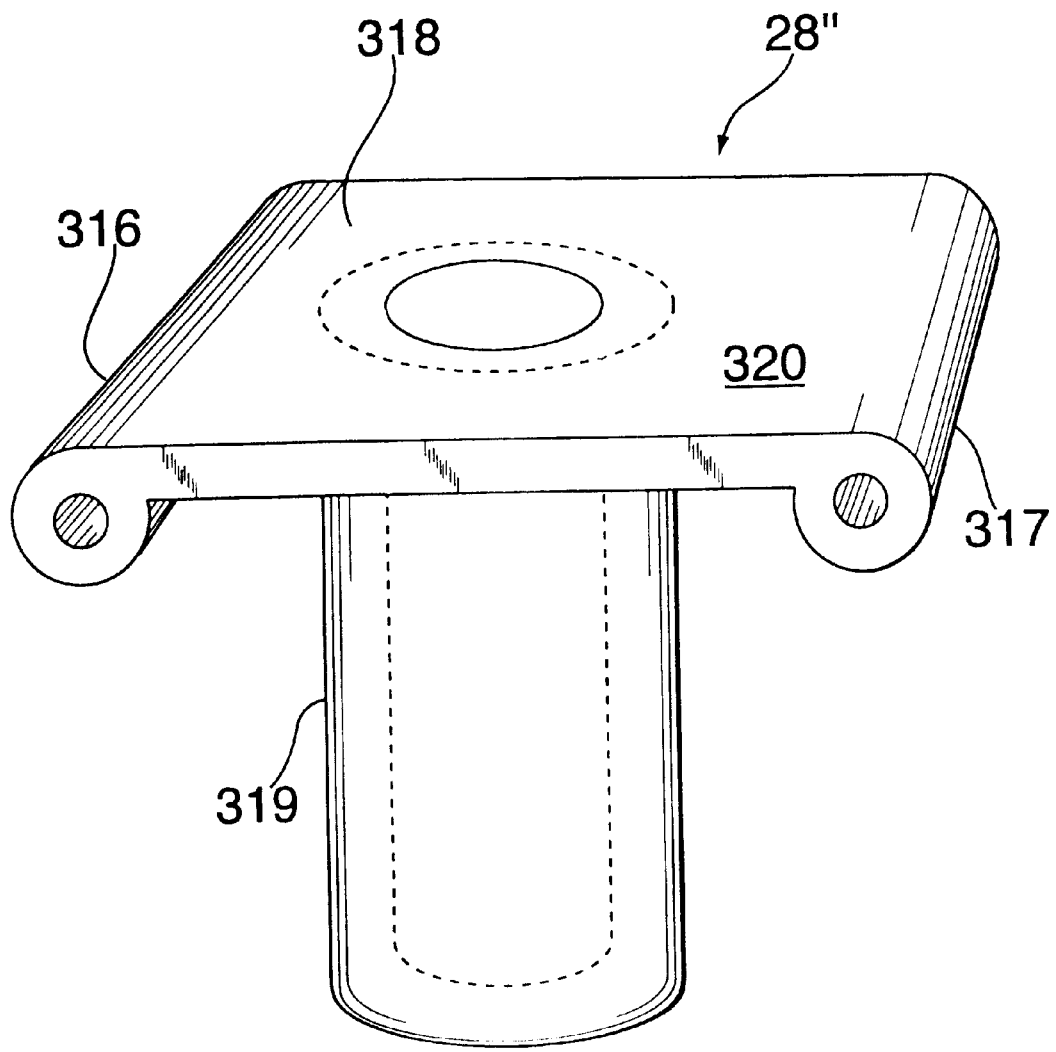
FIG. 12A shows one element, steering member, to aid in viewing FIGS. 11, 12, and 13.
Figure 13:
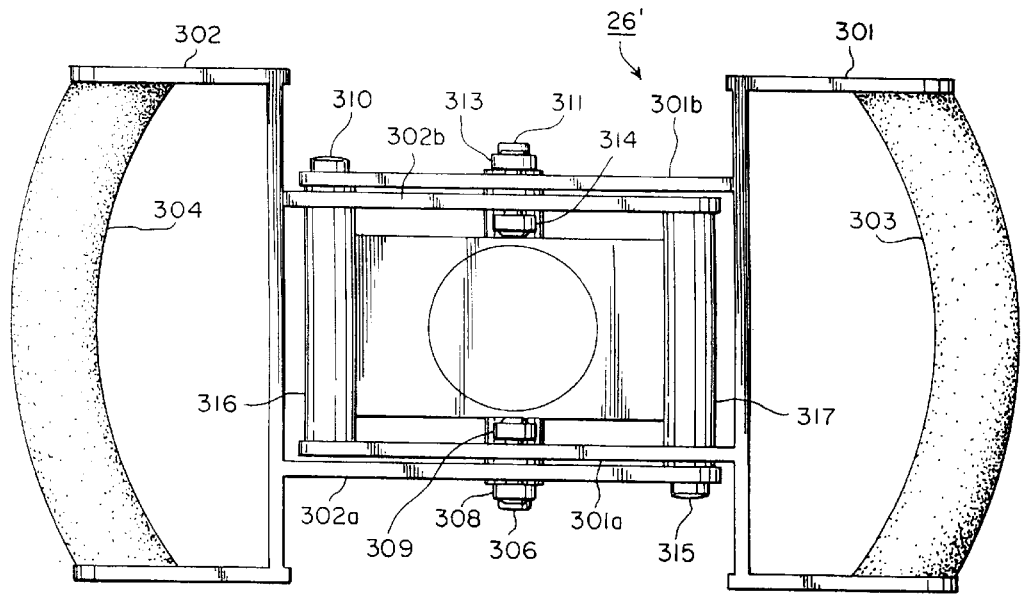
FIG. 13 is a top view, taken along the line 13—13 of FIG. 11.

As shown best in FIGS. 12A, 12, and 13, the steering member 28" of FIG. 11 comprises first and second ends 318 and 319. The first end 318 of steering member 28" is generally a flat portion 320 between first and second sides 316 and 317. The flat portion 320 of first end 318 is generally transverse to the axis of the cylindrical portion of end 319 and overlies end 319. The first side 316 is interposed between arms 301a and 301b of steering assembly 26'. Similarly, the first side 317 is interposed between arms 302a and 302b of steering wheel 26'. The cylindrical end 319 of steering member 28" is situated within the bore of sleeve 30', through which the first end 318 protrudes from and extends over the top of sleeve 30' and the second end 319 passes through and protrudes from the bottom of sleeve 30'. The steering member 28" has a bore dimensioned to allow passage of steering shaft 14.

The operation of the steering and braking control system 10 utilizing steering assembly 26', mechanism 28" and sleeve 30' of FIG. 11, requires connecting means wherein the pivotal steering member 28" is secured to the steering column 12 (not shown). The arms 301 and 302 of steering assembly 26' operate as a lever in the operation of the steering and braking control system. When downward force is exerted on steering handles 303 and 304, arms 301a, 301b, 302a and 302b are raised upward towards the steering handles 303 and 304, which correspondingly forces downward sleeve 30' which coacts with the force translating mechanism 32 previously disclosed in parent application Ser. No. 08/544,676 now U.S. Pat. No. 5,666,857.

It should be appreciated that in the operation of the steering and braking control system of FIG. 11, the steering assembly 26', steering member 28" and sleeve 30' operate to exert a downward movement upon the force translating mechanism 32, whereas the steering and braking control system of FIG. 1, with steering wheel 26, pivotal mechanism 28 and sleeve 30 of FIG. 1 operate with a upward movement upon the force translating mechanism 32. The force translating mechanism 32 of FIG. 1 must be adapted to properly coacts with the steering and braking control system of FIG. 11. As shown in FIG. 1, linking rod 108A, axial linking rod 110A, offset linking member 114A, and connecting rod 116 may be replaced by a single linking rod from sleeve 30' to directly translate the downward movement of sleeve 30' to brake pedal 18 to arrest the motion of the vehicle.

FIG. 12 illustrates a side view of the arrangement of the steering wheel 26', sleeve 30' and steering member 28". FIG. 12 shows arms 301a, 301b, 302a and 302b and their arrangement with respect to sleeve 30' and steering member 28".

FIG. 13 illustrates a top view of steering assembly 26', showing arms 301a, 301b, 302a and 302b, and their arrangement with respect to sleeve 30' and steering member 28".

Figure 14:
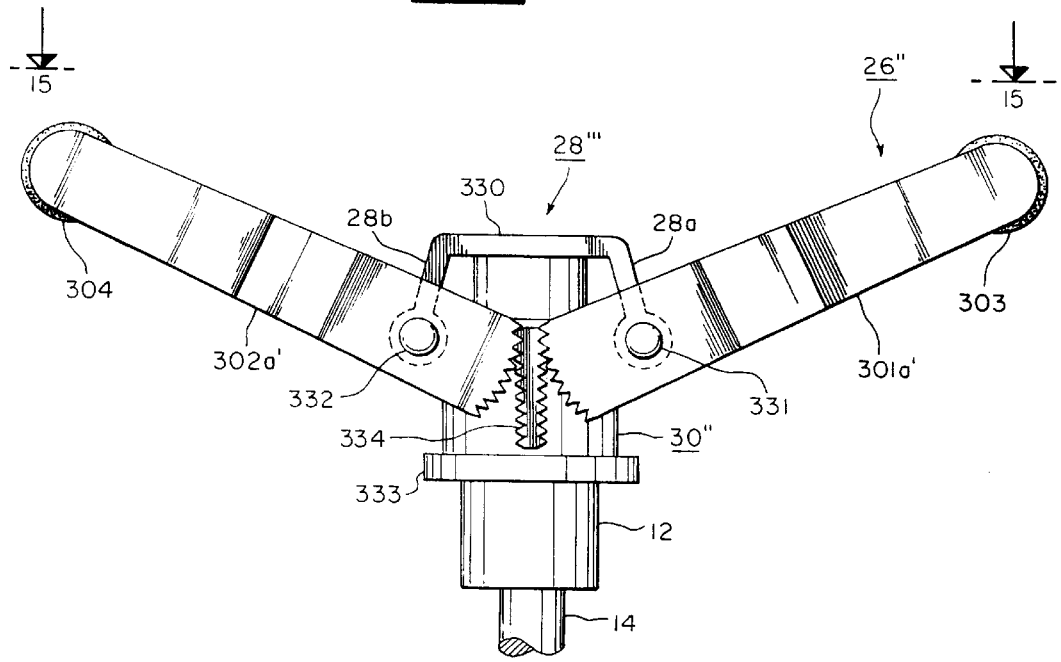
FIG. 14 is a schematic illustration of another embodiment of the steering wheel of the steering and braking control system of the present invention turned 90 degrees relative to its at-rest position.

A further embodiment of the present invention may be further described with reference to FIG. 14. FIG. 14 illustrates a steering wheel 26" that operates in a similar manner as that of the previously described steering wheel 26 but utilizes jaws instead of retaining pins to raise sleeve 30", which coacts with the force translating mechanism 32 previously disclosed in parent application Ser. No. 08/544,676. The steering assembly 26" comprise, of a pair of first and second arms 301a', 301b', 302a' and 302b'. Interposed between the first end of arms 301a' and 302b' is steering handle 303' (shown in FIG. 15). Similarly, interposed between the first end of the opposite arms 302a' and 302b' is steering handle 304' (shown in FIG. 15). The second ends of arms 301a', 301b', 302a' and 302b' have vertical jaws which coacts with sleeve 30".

The steering member 28" of FIG. 14 has a bridge-like structure with first and second legs 28a and 28b as its first end and the bridge 330 as its second end. The steering wheel 26" is connected to steering member 28''' with its first leg 28a interposed between the pair of first arms 301a' and 301b' through retaining pin 331. Similarly, second leg 28b is interposed between the pair of second arms 302a' and 302b' through retaining pin 332.

The sleeve 30" of FIG. 14 has a hat-like structure with a brim 333 and first and second protruding wings 334 and 336. Each protruding wings 334 and 336 has vertical jaws on its first and second ends. The vertical jaws of the first end of wing 334 coacts with the jaws of the second end of arm 301a' of steering assembly 26". Similarly, the vertical jaws of the second end of wing 334 coacts with the jaws of the second end of arm 302a'. The vertical jaws of the first end of wing 336 coacts with the jaws of the second end of arm 301b' of steering wheel 26". Similarly, the vertical jaws of the second end of wing 336 coacts with the jaws of the second end of arm 302b' (shown in FIG. 15). The sleeve 30" has a bore dimensioned to allow passage of the steering column 12 and steering shaft 14, which is secured to the bridge 330 of steering member 28''', allowing the steering shaft 14 to rotate correspondingly to the steering wheel 26".

The pair of arms 301a', 301b', 302a' and 302b of steering wheel 26" or steering assembly 26' operate as a lever in the operation of the steering and braking control system. When downward force is exerted on steering handles 303' and 304', the second ends of arms 301a', 301b', 302a' and 302b' are pivotally raised upward, which correspondingly raise sleeve 30", which coacts with the force translating mechanism 32 previously disclosed in parent application Ser. No. 08/544, 676 now U.S. Pat. No. 5,666,857.

Figure 15:
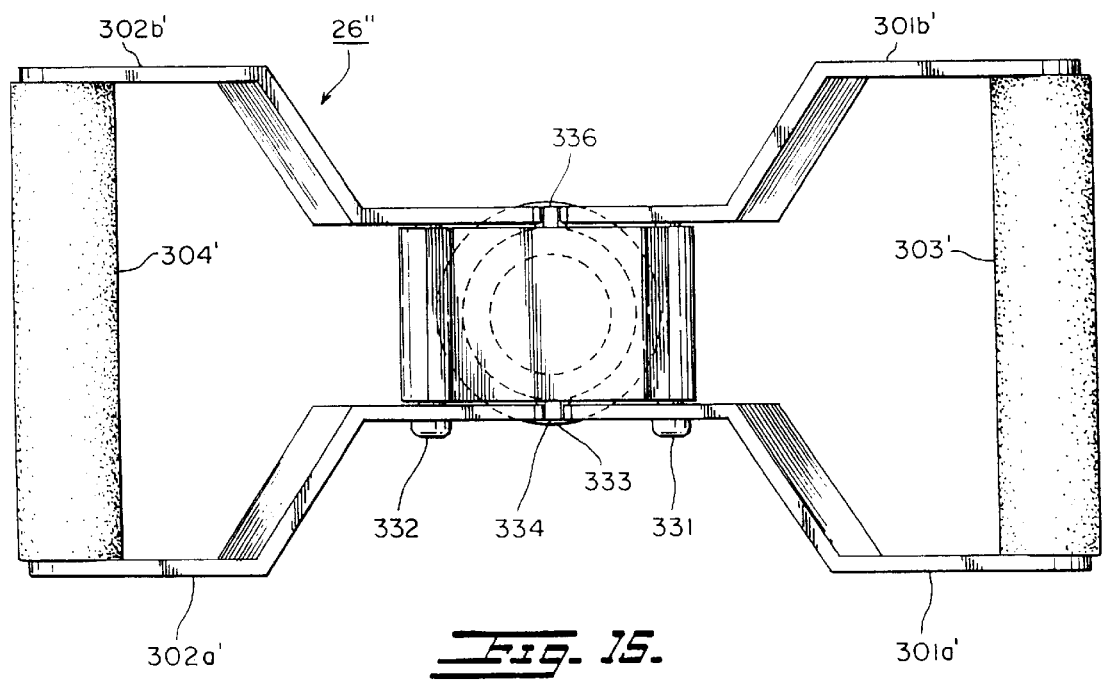
FIG. 15 is a top view, taken along the line 15—15 of FIG. 14, illustrating details of the steering wheel of the present invention.

FIG. 15 illustrates a top view of steering assembly 26", showing first and second pair of arms 301a', 301b', 302a' and 302b', and their arrangement with respect to steering member 28''' and sleeve 30".

Figure 16:
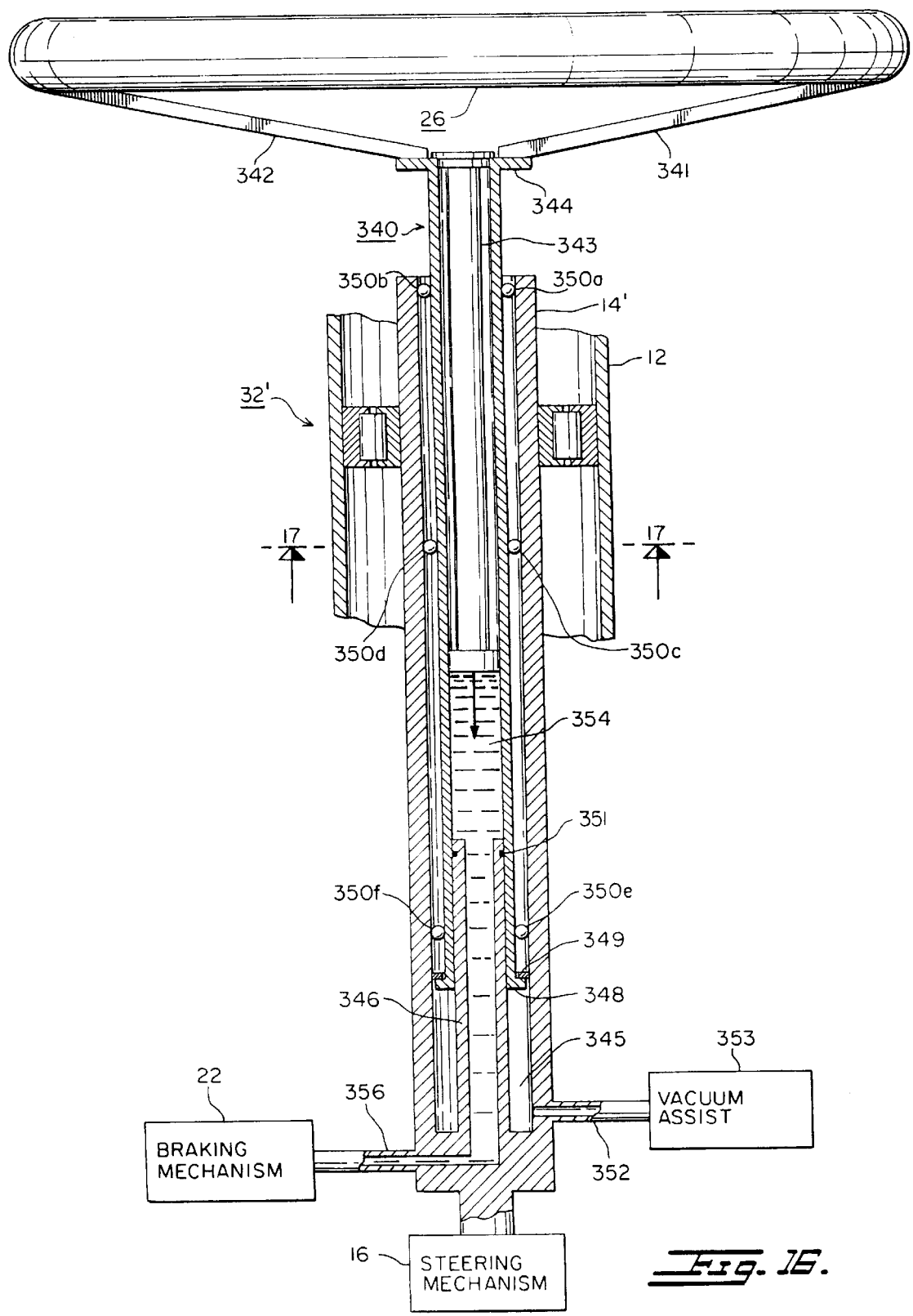
FIG. 16 is a schematic illustration of still another embodiment of the steering and braking control system of the present invention turned 90 degrees, relative to its at-rest position.

A further embodiment of the present invention may be further described with reference to FIG. 16. FIG. 16 illustrates steering and braking control mechanism 10' that operates in a similar manner as the steering and braking control mechanism 10 previously disclosed in the parent application Ser. No. 08/544,676, now U.S. Pat. No. 5,666, 857 but utilizes a conventional steering wheel 26 and incorporates a master brake cylinder 340 within the steering shaft 14' instead of a force translating mechanism 32 with external mechanical parts interacting with the braking mechanism 22. FIG. 16 illustrates a conventional steering wheel 26 with first and second arms 341 and 342 and a master brake cylinder 340 comprises of a hydraulic piston 343 and cylinder wall 344. The master brake cylinder 340 of FIG. 16 is axially nested within the steering shaft 14'. Similarly, the hydraulic piston 343 is nested within cylinder wall 344.

The steering assembly 26 of FIG. 16 comprises of first and second arms 341 and 342. The first ends of first and second arms 341 and 342 are secured to the steering wheel 26. The second ends of first and second arms 341 and 342 are secured to the first end of the cylinder wall 344.

The steering shaft 14' of FIG. 16 has a hollow well-like structure, with cylinder wall 344 and hydraulic piston 343 nested within and extending beyond the first end of steering shaft 14'. Within the hollow well of the steering shaft 14' is an inner wall 346, having an external dimension the same as the internal dimension of cylinder wall 344. The second end of the hollow well between the internal hollow well of steering shaft 14' and the inner wall 346 is space 345, connected to vacuum assist 353 through control line 352.

The second end of the hollow well within the inner wall 346 is space 354, connected to the braking mechanism 22 through hydraulic line 356. The second end of the steering shaft 14' is connected to the steering mechanism 16.

The cylinder wall 344 as shown in FIG. 16 has a hollow and hat-like structure having a brim 348 as second end. The first end of cylinder wall 344 is secured to the second ends of first and second arms 341 and 342 of steering wheel 26. The cylinder wall 344 is nested within the hollow structure of the steering shaft 14', separated by bearings 350a, 350b, 350c, 350d, 350e and 350f, which slide along axial groves 355 on the internal wall of steering shaft 14' and the external wall of cylinder wall 344. The brim 348 of cylinder wall 344 is nested within steering shaft 14', between the internal hollow wall of steering shaft 14' and external wall of inner wall 346. Where the brim of the cylinder wall 344 meets the internal wall of steering shaft 14' and the external wall of inner wall 346 are seals 348 and 351, respectively, which prevents any leakage of brake fluid from space 354. Rotational movement of the steering wheel 26 is translated to the first end of cylinder wall 344, which in turns translate to the steering shaft 14' through bearings 350a, 350b, 350c, 350d, 350e and 350f, which slide along axial groves 355.

The hydraulic piston 343 of FIG. 16 has first and second ends. The first end of hydraulic piston 343 is secured to the first end of cylinder wall 344. The hydraulic piston 343 is nested within the hollow structure of cylinder wall 344. The space 354 surrounded by the second end of hydraulic piston 343, internal wall of cylinder wall 344 and internal wall of inner wall 346 is filled with brake fluid, which travels through hydraulic line 356 to braking mechanism 22. The hydraulic piston 343 of FIG. 16 may be removed from the cylinder wall 344 to provide access to space 354 wherein brake fluid may be added. After addition of brake fluid to space 354, the hydraulic piston may be replaced to its original position, thereby acting as a plunger and conveniently bleed the braking mechanism 22 to remove air.

The steering and braking control system of FIG. 16 utilizes a conventional steering wheel 26 in the steering operation and a steering shaft 14' incorporating the master brake cylinder 340 to directly control the braking mechanism 22 of the vehicle. When downward force is exerted on steering wheel 26, both cylinder wall 344 and hydraulic piston 343 also move downward, axially within the steering shaft 14', aided by vacuum assist 353 through control line 352 within space 345, and guided by bearings 350a, 350b, 350c, 350d, 350e and 350f. Downward movement of the hydraulic piston 343 displaces brake fluid within space 354 to the braking mechanism 22 through hydraulic line 356, thereby causing the motion of the vehicle to arrest.

Figure 17:
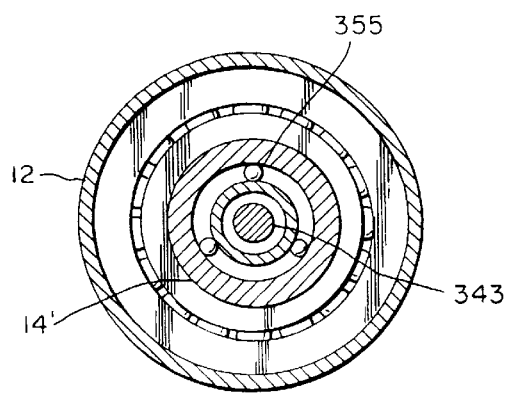
FIG. 17 is a view, taken along the line 17—17 of FIG. 16.

FIG. 17 illustrates the nesting arrangement of steering shaft 14', cylinder wall 344 and hydraulic piston 343, showing axial groves 355 on the internal wall of steering shaft 14' and external wall of cylinder wall 344, where bearing 350c and 350d slide.

It should now be appreciated that the practice of the present invention provides for various embodiments of the steering and control system 10 each of which allows the driver of a vehicle, which also includes race cars as well as golf carts, to not only control the steering of the vehicle, but in addition, thereto, allows the operator to merely press on the steering wheel to control the braking operations of the vehicle.

While the invention has been described in complete detail and pictorially shown in the accompanying drawings, it is not to be limited to such details, since many changes and modifications may be made to the invention without departing form the spirit and the scope thereof. Hence, it is described to cover any and all modifications and forms which may come within the language and scope of the claims.

For example, the terminology "steering wheel" was used in the embodiments shown at least in FIG. 1–10. to designate a conventional steering wheel by which means the operator controls the steering of the car, since that is the term most commonly used. However, such steering control means could take other shapes, such as arcs, rods, and other structural shapes, examples being illustrated in FIGS. 11, 12, 12A, 13, and 15. In referring to these figures, "steering assembly" was used to designate portions of a wheel.

What I claim is:

1. A steering and braking control system for a vehicle with a steering column having a longitudinally extending axis defined by a steering shaft that is connected to a steering mechanism of a vehicle, and a braking mechanism, said control system comprising:
    (a) a steering assembly including a pair of steering arms for simultaneously and continuously steering and braking said vehicle;
    (b) a steering member having first and second ends with said first end thereof pivotally connected to said steering arms and said second end thereof adapted for connection to said steering shaft whereby said steering member translates rotational movement applied to said steering assembly to said steering mechanism;
    (c) a sleeve slidably mounted about said steering member, said sleeve having first and second ends with the first end thereof pivotally connected to said steering assembly; and
    (d) a force translating mechanism having first and second ends, said first end thereof having means for connecting to said second end of said sleeve, and means for operatively connecting said second end of said force translating mechanism to said braking mechanism whereby said sleeve and force translating mechanism cooperatively translate longitudinal movement applied to said steering assembly as a force to said braking mechanism.

2. The steering and braking control system of claim 1, wherein said pair of steering arms being pivotally attached to said steering member for both longitudinal and rotational movement along the axis of the steering column.

3. A steering and braking control system for a vehicle with a steering column having a longitudinally extending axis defined by a steering shaft that is connected to a steering mechanism of a vehicle, a brake pedal connected to a braking mechanism of a vehicle, said control system comprising:
    (a) a steering assembly having first and second arms, said first arm having first and second ends and said second arm having first and second ends;
    (b) a steering member having first and second ends with said first end thereof having means for pivotally connecting to the corresponding second ends of each of said first and second arms of said steering assembly and said second end of said steering member having means for connecting to said steering shaft whereby said steering member translates rotational movement applied to said steering assembly to said steering mechanism;
    (c) a sleeve slidably mounted about the steering member, said sleeve having first and second ends with the first end thereof connected to said first and second arms of said steering assembly; and
    (d) a force translating mechanism having first and second ends, said first end thereof having means for connecting to said second end of said sleeve, and means for connecting said second end of said force translating mechanism to said brake pedal whereby said sleeve and force translating mechanism cooperatively translate longitudinal movement applied to said steering assembly as a force to said braking mechanism.

4. The steering and braking control system according to claim 3, wherein said first and second arms of said steering assembly are curved and parallel.

5. The steering and braking control system of claim 3, wherein said first and second arms of said steering assembly being curved and parallel, and said steering assembly being arranged to have said first and second arms pivotally interconnected to said first end of said sleeve.

6. The steering and braking control system according to claim 5, wherein said steering member is arranged to have its first end pivotally connected to said second ends of said first and second arms of said steering assembly so that said sleeve moves away from said first end of said steering member when movement is exerted on said first ends of said first and second arms of said steering assembly.

* * * * *